United States Patent [19]

Krogmann et al.

[11] Patent Number: 5,115,570
[45] Date of Patent: May 26, 1992

[54] METHOD FOR ELIMINATING GYRO ERRORS

[76] Inventors: Uwe Krogmann, Zur Äsche 24, 7770 Überlingen-Nussdorf; Hagen Kempas, Kreuzstrasse 25A, 7770 Überlingen 12, both of Fed. Rep. of Germany

[21] Appl. No.: 570,389

[22] Filed: Aug. 21, 1990

[30] Foreign Application Priority Data

Aug. 24, 1989 [DE] Fed. Rep. of Germany ....... 3927920

[51] Int. Cl.$^5$ ............................................. G01C 19/38
[52] U.S. Cl. ........................................ 33/326; 33/324; 33/321
[58] Field of Search ............... 33/326, 324, 301, 318, 33/321, 322; 74/5.6 E, 5.6 D; 434/186

[56] References Cited

U.S. PATENT DOCUMENTS

| | | | |
|---|---|---|---|
| 2,697,218 | 12/1954 | Glenny | 74/5.6 E |
| 2,972,195 | 2/1961 | Campbell et al. | 33/324 |
| 2,976,618 | 3/1961 | Campbell et al. | 33/324 |
| 2,999,391 | 9/1961 | Freebairn et al. | 74/5.37 |
| 3,173,216 | 3/1965 | Johnston | 33/324 |
| 3,936,948 | 2/1976 | Maselli | 33/324 |
| 4,214,482 | 7/1980 | Bouchard | 33/326 X |
| 4,250,442 | 2/1981 | McCammon | 318/722 |
| 4,461,089 | 7/1984 | Krogman | 33/324 |
| 4,487,083 | 12/1984 | Quermann | 74/5.6 E |
| 4,592,242 | 6/1986 | Kempas | . |
| 4,823,626 | 4/1989 | Hartmann et al. | . |
| 4,914,598 | 4/1990 | Krogmann et al. | . |
| 4,993,274 | 2/1991 | Downton | 74/5.6 E |
| 5,042,156 | 8/1991 | Huddle | 33/321 |

FOREIGN PATENT DOCUMENTS

| | | | |
|---|---|---|---|
| 0251157 | 1/1988 | European Pat. Off. | . |
| 0263777 | 4/1988 | European Pat. Off. | . |
| 2903282 | 6/1980 | Fed. Rep. of Germany | . |
| 2922412 | 12/1980 | Fed. Rep. of Germany | . |
| 3033281 | 4/1982 | Fed. Rep. of Germany | . |
| 3101828 | 8/1982 | Fed. Rep. of Germany | . |
| 3143527 | 5/1983 | Fed. Rep. of Germany | . |
| 3213720 | 10/1983 | Fed. Rep. of Germany | . |
| 3229819 | 2/1984 | Fed. Rep. of Germany | 33/324 |
| 2922414 | 4/1985 | Fed. Rep. of Germany | . |
| 2922411 | 5/1987 | Fed. Rep. of Germany | . |
| 2040450 | 5/1983 | United Kingdom | . |
| 2083910B | 3/1984 | United Kingdom | . |

Primary Examiner—William A. Cuchlinski, Jr.
Assistant Examiner—Alvin Wirthlin
Attorney, Agent, or Firm—Lee, Mann, Smith, McWilliams, Sweeney & Ohlson

[57] ABSTRACT

In order to eliminate gyro errors of electrically caged, two-axis gyros, which have a pick-off (52,54) and a torquer (46,48) on each input axis, and each pick-off (52,54) arranged on one input axis energizes the torquer (48,46) on the other input axis, a first measurement is made with a first direction of rotation of the gyro rotor (42). Subsequently, for a second measurement, the direction of rotation of the gyro rotor (42) is reversed and, at the same time, the polarity of the signals from the pick-offs (52,54) is inverted. A measuring value is formed from the gyro signals obtained with both of these measurements.

9 Claims, 6 Drawing Sheets

METHOD FOR ELIMINATING GYRO ERRORS

TECHNICAL FIELD

The invention relates to a method for eliminating gyro errors of electrically caged, two-axis gyros, which has a pick-off and a torquer on each input axis, each pick-off on one input axis energizing the torquer arranged on the other input axis

BACKGROUND ART

Electrically caged or restrained, two-axis gyros are known. Such gyros have a gyro rotor, which rotates about a spin axis. The spin axis is angularly movable, relative to a housing, with two degrees of freedom about two mutually orthogonal input axes, each of which is orthogonal to the spin axis. A pick-off is arranged on each of the input axes and responds to deflections of the gyro rotor about this input axis. And a torquer is arranged on each of the input axes to exert a torque on the gyro rotor about the input axis. The signal from each of the two pick-offs, after amplification, is applied to the torquer arranged on the respective other input axis. In accordance with the gyro laws, the torque exerted by the torquer counteracts the deflection causing the signal from the pick-off. Thereby the gyro rotor is caged or restrained to a central position about the two input axes. Such electrically caged, two-axis gyros are described in DE-B-29 03 282, in DE-A-30 33 281 and EP-A-0 251 157.

Such gyros are subjected to systematic errors. From DE-C2-29 22 411 it is known to at least partly eliminate such systematic errors by making at least two measurements with the gyro at two positions of the gyro which are angularly offset by 180° about one of the input axes. It is also known to measure with a gyro at three angular positions which are angularly offset by 90° from each other (DE-A-29 22 412).

From DE-C2-31 43 527 and US-A-4 461 089 it is further known, in order to eliminate certain gyro errors, to measure in two positions of the gyro angularly spaced by 180° about the spin axis of the gyro, and to form the difference of the measured values. In this case, the spin axis is vertical. A north angle is determined from the ratio of the differences of the signals applied to the two torquers.

EP-A2-0 263 777 shows an integrated, redundant reference system for flight control and for the generation of heading and attitude information. A plurality of electrically caged, two-axis gyros are arranged aircraft-fixed in such a way that they provide angular rate information redundantly. A plurality of accelerometers provide correspondingly redundant acceleration information. Signal processing means are provided by which erroneous angular rate and acceleation information is eliminated. The thus failure-compensated angular rate and acceleration information provides stabilizing signals for the flight controller. Furthermore, heading and attitude information is generated from this failure-compensated angular rate and acceleration information.

With the reference system as disclosed in EP-A2-0 263 777, a coarse alignment and subsequently a fine alignment of the system take place. Velocity increment signals from the accelerometers are transformed from the system-fixed coordinate system into an earth-fixed coordinate system in accordance with a directional cosine matrix. The transformed velocity increment signals are applied to a Kalman filter which models the influence of the rotation of the earth on the angular rate sensors and generates actuating signals independent of the rotation of the earth for the heading and attitude correction, when the coordinate system defined by the directional cosine matrix deviates from the earth-fixed coordinate system.

DE-A-31 01 828 relates to a method for determining the zero error of a single-axis rate gyro. In order to determine the zero error, and in particular to determine the angle between a reference axis and geographic north, the output signals of the rate gyro are measured at different rotary speeds of the gyro rotor. The sum of all zero errors are determined by computational combination of the measuring results.

DE-C2-32 13 720 describes a dynamically tuned gimbal suspension with two degrees of freedom for a gyro rotor.

DISCLOSURE OF INVENTION

It is the object of the invention to eliminate gyro errors of an electrically caged two-axis gyro by simple means.

It is a further object of the invention to achieve elimination of gyro errors of redundantly provided gyros in such a way that the failure tolerance of the gyro arrangement is not impaired.

With the method of the invention (a) a first measurement is made with a first direction of rotation of the gyro rotor, (b) subsequently, a second measurement is made with the direction of rotation of the gyro rotor reversed and, at the same time, the signals from the pick-offs being inverted, and (c) a measured value is formed using the gyro signals obtained with the two measurements.

Then it is no longer necessary to bodily rotate the gyro itself. Only an electrical change-over is required: Firstly, the direction of rotation is reversed. With regard to the gyro errors to be eliminated, this has the same effect as a rotation of the gyro about its spin axis by 180°. Secondly, the polarity of the pick-offs has to be reversed correspondingly, as by the reversal of the direction of rotation also the pecession caused by a certain torque is reversed.

An embodiment of the invention is described in greater detail hereinbelow with reference to the accompanying drawings.

PREFERRED EMBODIMENTS OF THE INVENTION

Figure 1:
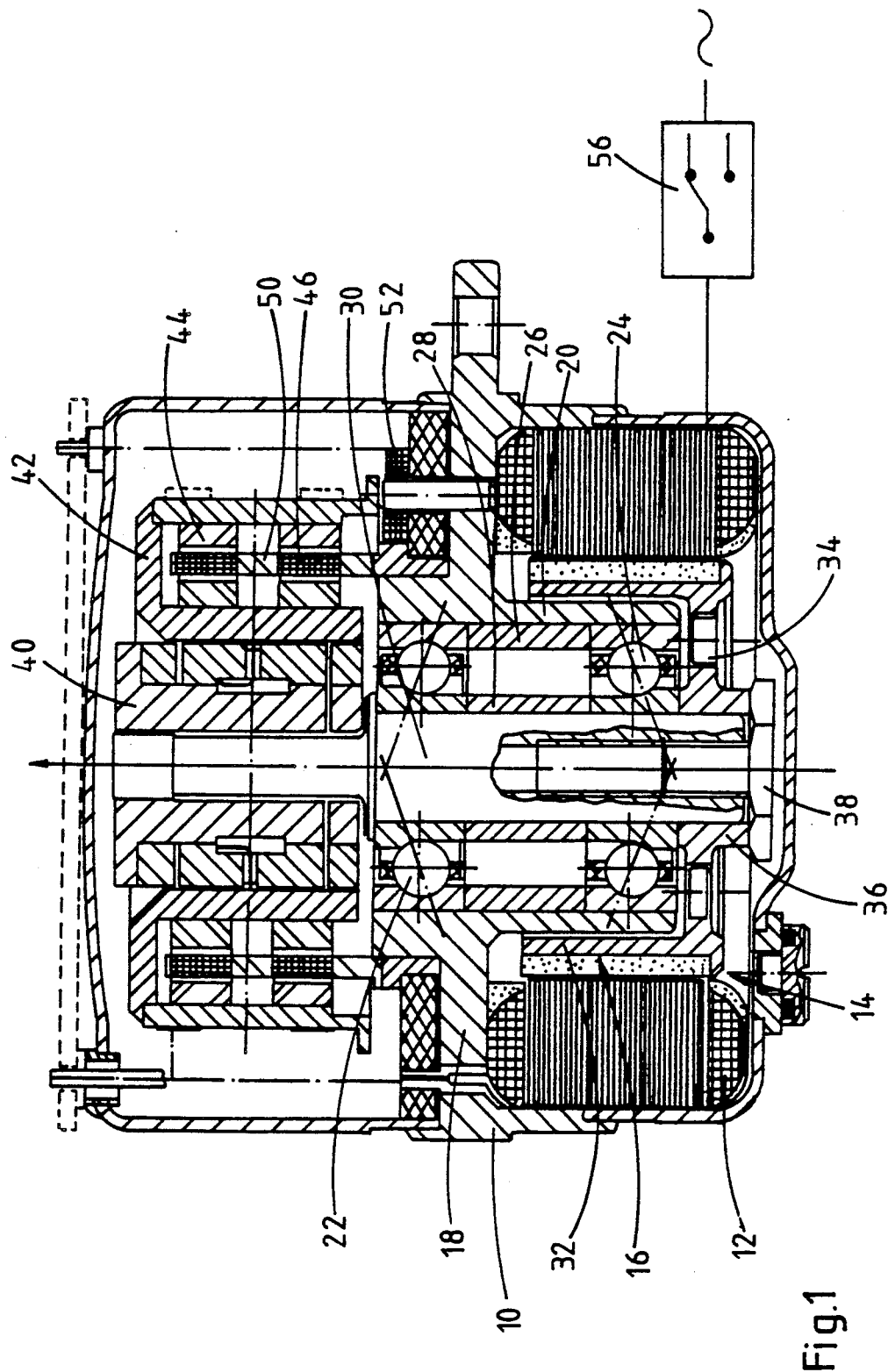
FIG. 1 is a longitudinal sectional view of a gyro of the type used herein.

FIG. 1 illustrates the mechanical set-up of an electrically caged, two-axis gyro. The gyro is a dynamically tuned gyro. In such a gyro, the gyro rotor is driven by a driving motor through a cardan joint. The cardan joint has a gimbal and crossed-spring joints. The crossed-spring joints, due to their spring force, exert restoring torques on the gyro rotor. The gimbal also generates dynamic torques. The arrangement is dynamically tuned in such a way that these interfering torques cancel each other and the gyro rotor rotates as if it were completely freely movable. This gyro rotor is then electrically caged to a central position. The currents supplied to the torquers with this type of caging are indicative of the angular rates about the input axes.

Numeral 10 designates a housing of the gyro. A stator 12 of a driving motor 14 is located in the housing. The rotor of the driving motor 14 is designated by numeral 16.

An annular partition is integral with the housing 10. A sleeve-shaped housing portion 20 is integral with the inner edge of the partition 18. Two ball bearings are arranged in the sleeve-shaped housing portion and are held at a distance from each other by spacer sleeves 26 and 28. A shaft 30 is mounted in the ball bearings. The spacer sleeve 28 is arranged on the shaft 30 between the inner races of the ball bearings 26 and 28. The rotor 16 of the driving motor 14 has a sleeve-shaped rotor portion 32, which extends between stator 12 and sleeve-shaped housing portion 20. A flat, annular rotor portion 34 and a hub portion 36 are integral with the sleeve-shaped rotor portion 32. The hub portion 36 is arranged on the shaft 30 and is clamped to the shaft 30 by a screw 38.

The shaft 30 is connected to a gyro rotor 42 through a cardan joint 40. The cardan joint 40 is designed similar to the DE-C2-32 13 720 mentioned above and, therefore, is not described in greater detail. The gyro rotor 42 has a magnet ring 44. The magnet ring cooperates with torquers, of which only the torquer 46 can be recognized in FIG. 1. The torquer is arranged on a collar 50 which extends into an annular cavity of the rotor 42. Pick-offs are arranged on the annular partition, only pick-off 52 being visible in FIG. 1. The pick-offs respond to angular deflections about a respective one of two mutually orthogonal input axes. Pick-off 52 responds to deflections of the gyro rotor 42 about an input axis perpendicular to the plane of the paper of FIG. 1.

The direction of rotation of the driving motor 14 is reversible by means of a reversing device 56, which is well known and, therefore, is not described in detail.

Figure 2:
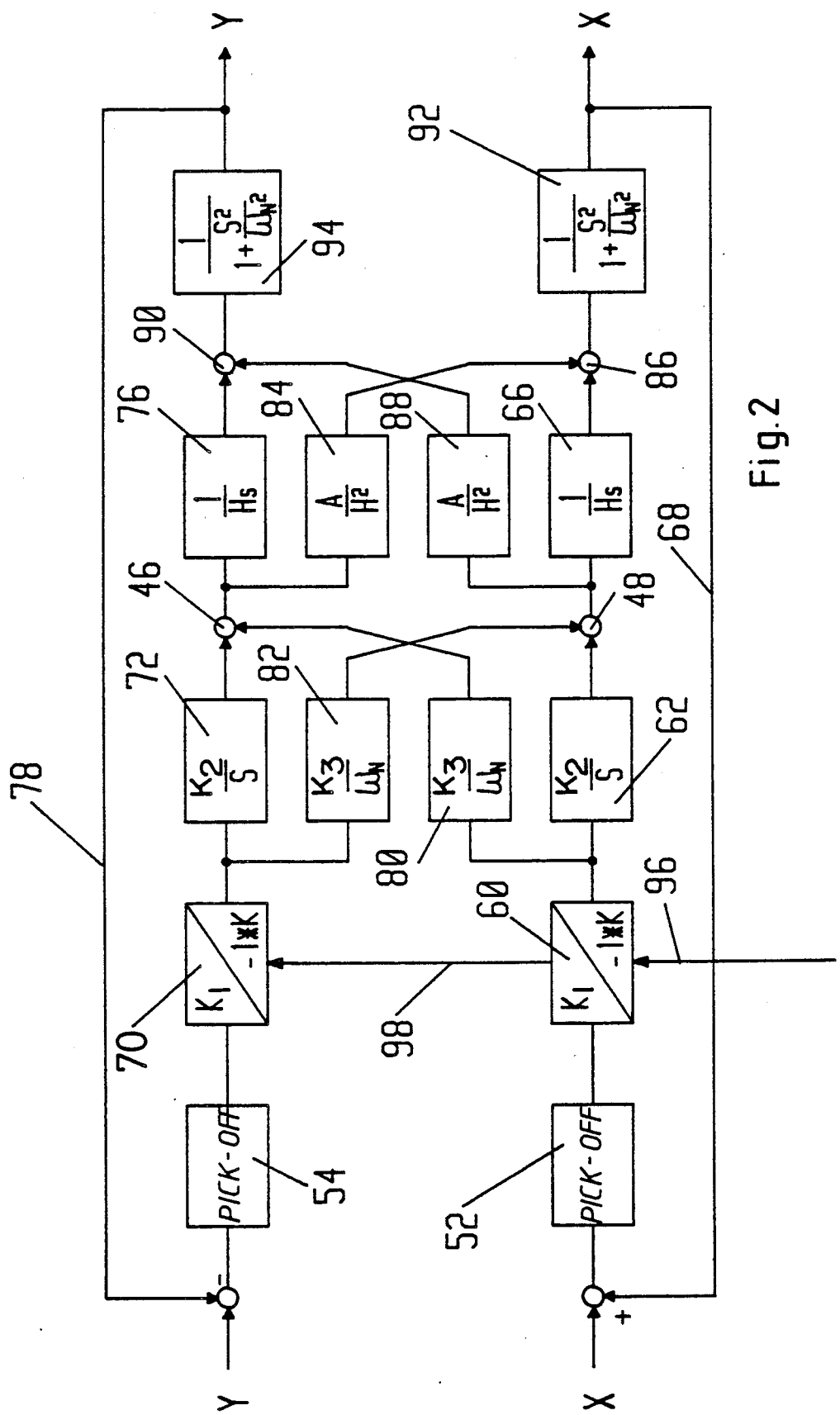
FIG. 2 is a block diagram and illustrates the electrical caging of the gyro and the reversal of the pick-off signals.

FIG. 2 illustrates, as a block diagram, the electrical caging of the gyro rotor 42 to its central position.

Deflections of the gyro rotor 42 about its first input axis, the x-axis, which here extends perpendicular to the plane of the paper of FIG. 1, are detected by pick-off 52 and are converted into a corresponding electrical signal. This signal is applied to the torquer 48, which exerts on the gyro rotor 42 a torque about the second input axis, the y-axis, which extends in the plane of the paper of FIG. 1.

The pick-off signal from pick-off 52 is amplified by an amplifier 60 having a gain factor $K_1$. The amplified pick-off signal is then applied to a further, integrating amplifier 62 having a transfer function $K_2/s$. The output signal of this integrating amplifier 62 is applied to the torquer 48 acting about the y-axis. The torquer 48 exerts a torque on the gyro rotor 42. This causes precession of the gyro rotor 42 from its central position about the x-axis. The rate of this precession is inversely proportional to the gyro spin H. In the block diagram, this is represented by block 66 with the transfer function 1/Hs. In these formulas, "s" is, as usual, the variable of the Laplace transform. The result is a deflection about the x-axis caused by the torque and counteracting the deflection detected by pick-off 52, this deflection returning the gyro rotor 42 to its central position. This is represented in the block diagram by the feedback loop 68.

The pick-off signal from pick-off 54 is amplified by an amplifier 70 having a gain factor $K_1$. The amplified pick-off signal is then applied to a further, integrating amplifier 72 having a transfer function $K_2/s$. The output signal of this integrating amplifier 72 is applied to the torquer 46 acting about the x-axis. The torquer 46 exerts a torque on the gyro rotor 42. This causes precession of the gyro rotor 42 from its central position about the y-axis. The rate of this precession is inversely proportional to the gyro spin H. In the block diagram, this is represented by block 76 with the transfer function 1/Hs. In these formulas, "s" is, as usual, the variable of the Laplace transform. The result is a deflection about the y-axis caused by the torque and counteracting the deflection detected by pick-off 54, this deflection returning the gyro rotor 42 to its central position. This is represented in the block diagram by the feedback loop 78.

In order to damp nutation oscillations, also the signal from pick-off 52 is applied to the torquer 46 with a factor of $K_3/\omega_N$, $\omega_N$ being the nutation frequency. In corresponding manner, in order to damp nutation oscillations, also the signal from the pick-off 54 is applied to torquer 48 with this factor $K_3/\omega_N$. This is represented by blocks 80 and 82, respectively. Preferably the processing of the pick-off signals and the generation of the currents in the torquers is effected by digitizing the signals from the pick-offs 52 and 54, processing the signals digitally, and then re-converting them into analog currents, as has been described, for example, in the EP-A2-0 251 157 which corresponds to U.S. Pat. No. 4,823,626, mentioned above and is incorporated herein by reference.

The torque of the torquer 46 acting about the x-axis affects also the deflection of the gyro rotor 42 about the x-axis. This is illustrated by the cross connection with block 84 which symbolizes the superposition in summing point 86 of the torque of the torquer 46 with a factor $A/H^2$ on the deflection caused by the precession, wherein A is a proportionality factor which depends on the mechanical characteristics of the gyro. Correspondingly, the torque of the torquer 48 affects the deflection of the gyro rotor 42 about the y-axis with a factor $A/H^2$. This is illustrated by the cross connection with block 88 and the summing point 90, which represents the superposition of this deflection on the deflection of the gyro rotor 42 caused by the precession. The resultant deflection which returns the gyro rotor 42 to its central position results from these two superposed deflections which become effective with a transfer function.

$$\frac{1}{1 + s^2/w_N^2}.$$

This is illustrated in FIG. 2 by blocks 92 and 94, respectively.

When the direction of rotation of the gyro rotor is reversed for the elimination of gyro errors, also the polarities of the signals of the pick-offs 52 and 54 are reversed. This is achieved by multiplying the factor $K_1$ of blocks 60 and 70 by $-1$ by a signal at inputs 96 and 98, respectively.

Figure 3:
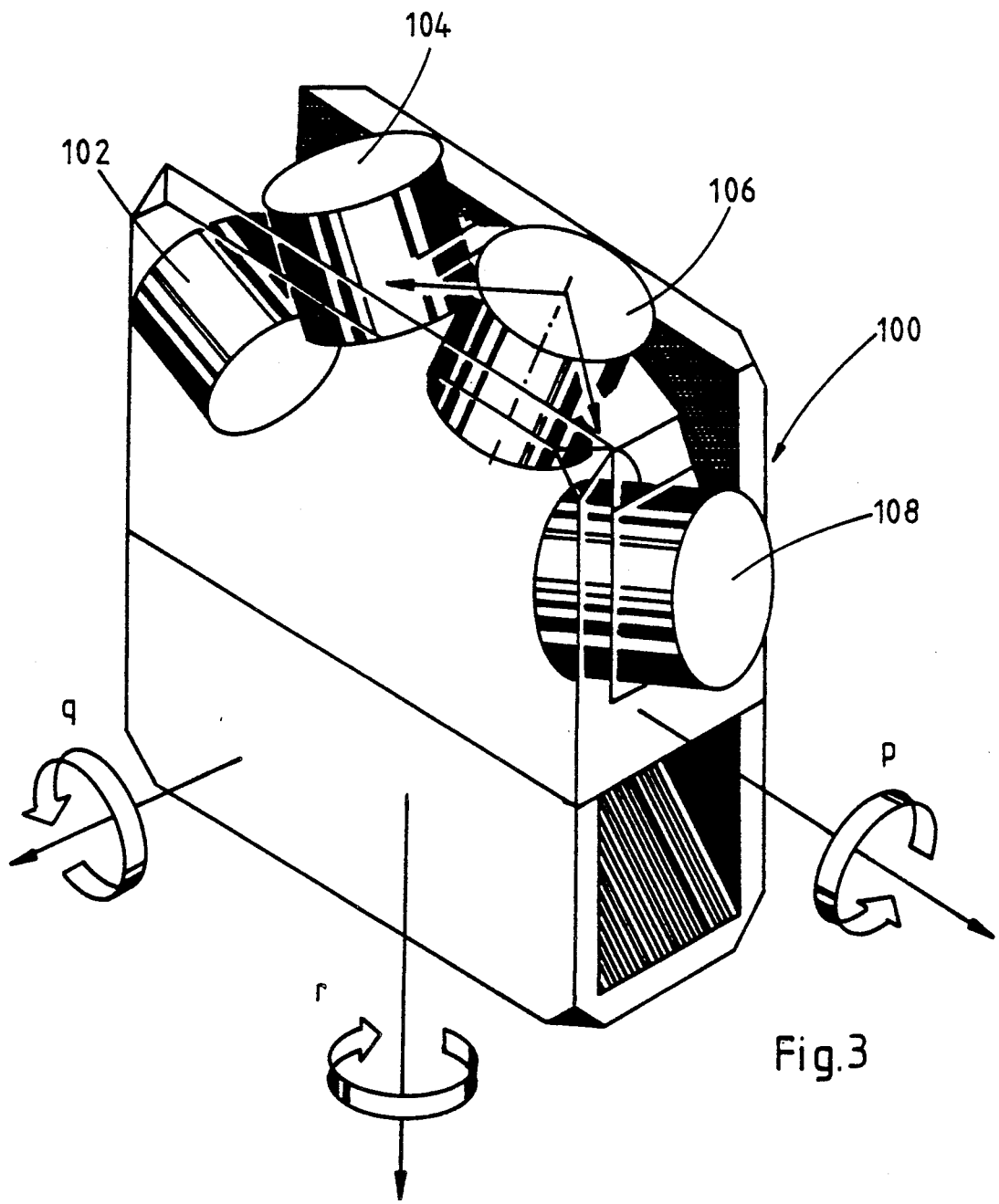
FIG. 3 is a perspective illustration and shows the redundant arrangement of gyros in a reference system for the flight control and for the generation of heading and attitude information.

The gyro illustrated in FIGS. 1 and 2 is part of a gyro assembly 100, as illustrated in FIG. 3. This gyro assembly 11 contains four gyros 102, 104, 106 and 108. As described in EP-A2-0 263 777 which corresponds to U.S. Pat. No. 4,914,598, and is incorporated herein by reference; the input axes of the four gyros are located on the surface of a notional cone which is oriented parallel to the vehicle transverse axis and has an opening angle of 90°. From the signals which are obtained from the various gyros 102, 104, 106 and 108 at the respective two input axes the angular rates can be determined multiply redundantly. Rotation of the whole gyro assembly 100 about the instrument-fixed vertical axis as viewed in FIG. 3 for elimination of gyro errors—theoretically possible—would be inexpedient, because then the whole gyro assembly in spite of the multiple redundancy of the gyros 102, 104, 106 and 108 would fail, if the rotary mechanism fails.

For this reason, in order to eliminate gyro errors during the alignment of the reference system in which the gyro assembly is used, the direction of rotation of the gyro rotor 42 is reversed in the described manner in at least one of the gyros, while, at the same time, the polarities of the signals of the pick-offs 52 and 54 are also inverted.

Figure 4:
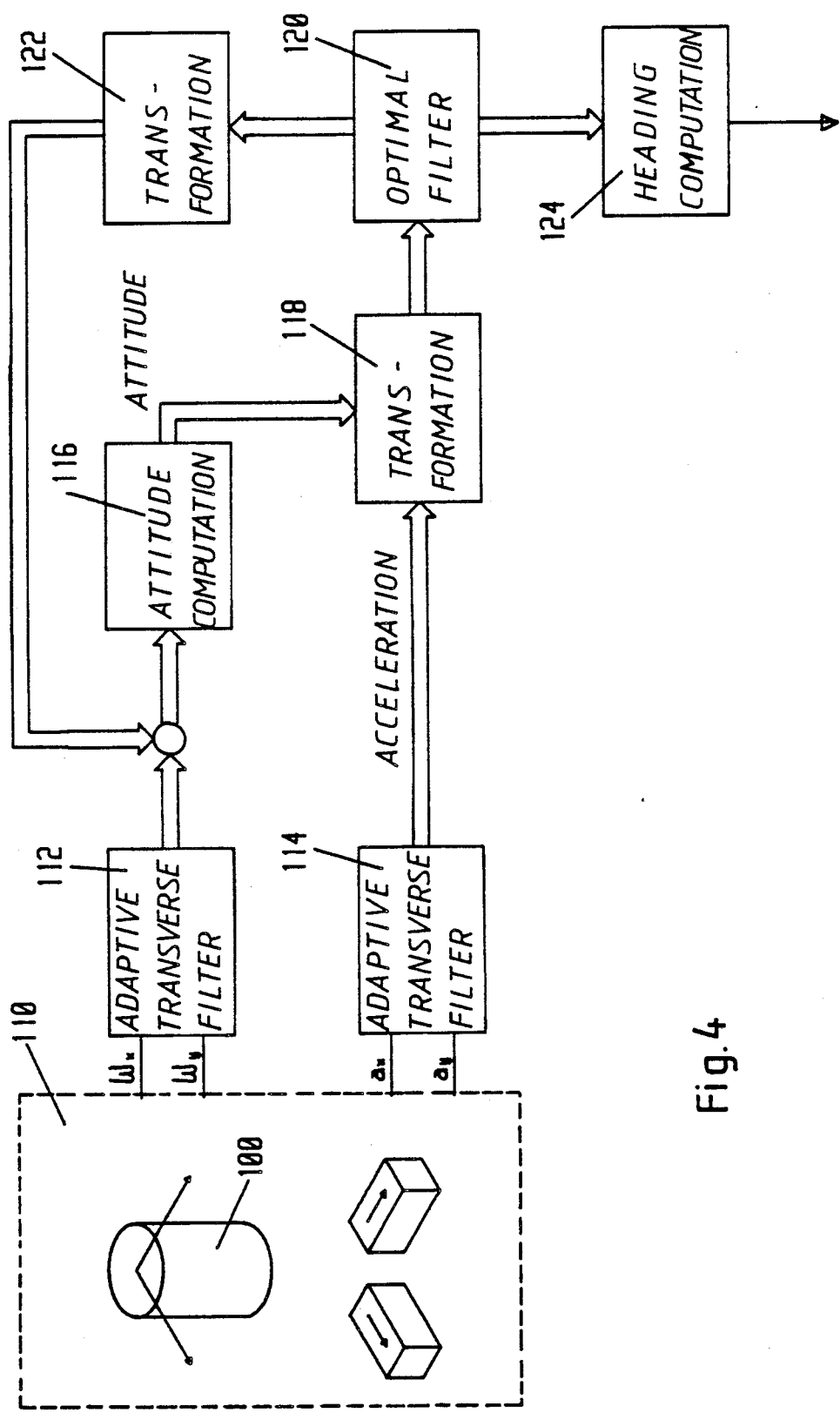
FIG. 4 is a block diagram and illustrates the alignment of a reference system with a gyro of FIGS. 1 and 2.
Figure 5:
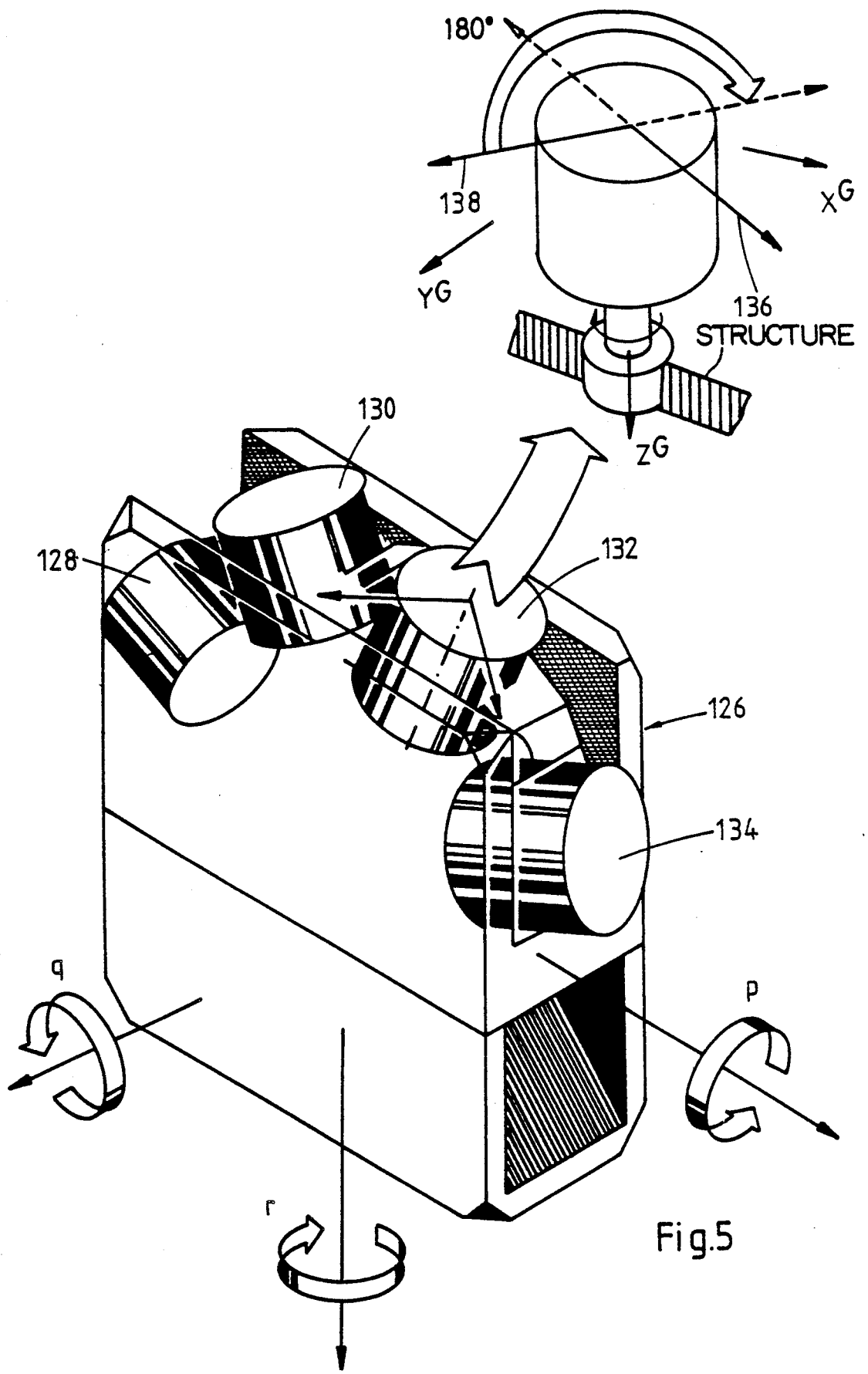
FIG. 5 is a schematic perspective view and illustrates a modified way of eliminating gyro errors.

The alignment of a multiply redundant reference system with a gyro assembly of FIG. 3 is described in the above mentioned EP-A2-0 263 777 and is illustrated in a block diagram in FIG. 4. The axis in FIGS. 3 and 5 are instrument-fixed orthogonal axes and "p", "q" and "r" angular rates as measured about these axes.

A sensor unit 110 which contains the gyro assembly 100 of FIG. 3 and, in addition, redundantly provided accelerometers (not shown), provides two angular rates $\omega_x$ and $\omega_y$ and two components of the acceleration of $a_x$ and $a_y$. The signals are filtered by adaptive transversal filters 112 and 114, respectively. The adaptive transversal filters serve to suppress measuring noise and aliasing effects. The result is a two dimensional angular rate vector. Attitude information is obtained from the angular rate vector as illustrated by block 116. With this attitude information, the two dimensional acceleration vector also obtained is transformed into a certain mathematical reference system. This is illustrated by block 118. An optimal filter 120 is implemented in this reference system.

The optimal filter 120, firstly, provides correction signals which, after re-transformation into the original reference system in accordance with block 122, are used for correcting the attitude information. Thereby the attitude errors and thus the errors in the description of said mathematical reference system are reduced. Secondly, the optimal filter 120 provides estimated values of certain state variables, from which a heading information can be obtained by signal processing 124. The heading information describes the orientation of the described reference system with respect to an earth-fixed reference system.

During this fine alignment one of the gyros, for example gyro 106, can be operated once with one direction of rotation of the gyro rotor 42 and one polarity of the signals of the pick-offs 52 and 54, and then with the opposite direction of rotation and the opposite polarity of the signals of the pick-offs 52 and 54. Thereby, the optimal filter 120 can estimate the gyro drift and thereby can considerably reduce its influence on the errors of the heading computation in the signal processing 124.

The course of operation is as follows:

At first, the gyro rotor 42 is driven with a first direction of rotation. The signals from the pick-offs 52 and 54 are applied with a first polarity. A coarse alignment is effected (similar to that described in EP-A2-0 263 777 and said corresponding U.S. Pat. No. 4,914,598) and subsequently a fine alignment takes place as described above.

Thereafter, the direction of rotation of the gyro rotor 42 is reversed, and a second fine alignment is carried out at the thus reversed direction of rotation of the gyro rotor 42 and with a second polarity of the pick-offs 52 and 54 opposite to the aforementioned first polarity thereof. The heading angle corrected for gyro errors results as a mean of the two heading angles obtained with the two fine alignment steps.

A modified embodiment is illustrated in FIG. 5. In the embodiment of FIG. 5, the gyro is rotated into different positions. However there is no rotation of the whole gyro assembly 126 with four gyros 128, 130, 132 and 134, which would present the problems mentioned above, but only gyro 134. As has been illustrated at the top in FIG. 5, this gyro can be consecutively rotated into a 0°-position and into a 180°-position. In the 0°-position, the two input axes 136 and 138 of the gyro 132 point to the front and to the right, and to the front and to the left, respectively in the Figure. In the 180°-position, the input axes point to the rear and to the left, and to the rear and to the right, respectively. This is shown in FIG. 5 in dashed lines. The course of operation of the coarse and fine alignments of the reference system is the same as described with reference to FIGS. 3 and 4. However the first coarse and fine alignments are carried out with the 180°-position of the gyro 132, and the second coarse and fine alignments are carried out with the 0°-position. In This way, the gyro 132, subsequently during the further operation, is correctly oriented relative to the remaining gyros 128, 130 and 134.

Figure 6:
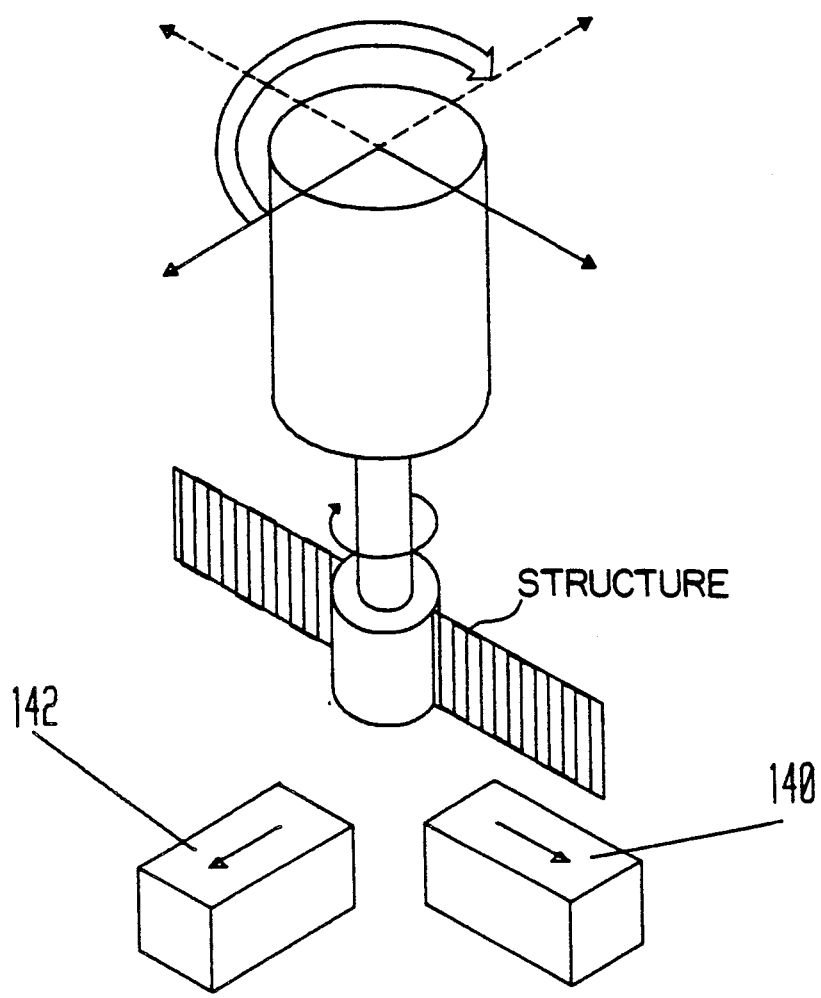
FIG. 6 is a further modification of the embodiment of FIG. 5.

As illustrated in FIG. 6, the element rotatable with the gyro 132 can carry also the associated accelerometers 140 and 142

We claim:

1. A method of eliminating gyro errors of electrically caged, two-axis gyros of the type having a housing, a gyro rotor rotating in said housing about a spin axis, a first pick-off responding to rotary movement of said gyro rotor relative to said housing about a first input axis orthogonal to said spin axis, a second pick-off responding to rotary movement of said gyro rotor relative to said housing about a second input axis orthogonal to both said spin axis and said first input axis, a first torquer arranged to exert a torque on said gyro rotor about said first input axis, said first torquer being energized by a first torquer current derived from signals from said second pick-off through amplifier network means, a second torquer arranged to exert a torque on said gyro rotor about said second input axis, said second torquer being energized by a second torquer current derived from signals from said first pick-off through amplifier network means, whereby said first and second torquer currents are indicative of angular rates of said housing relative to inertial space about said second and first input axes, respectively; the method comprising the steps of:

(a) measuring, during a first measuring step, said torquer currents as measures of said angular rates with a first direction of rotation of said gyro rotor, (b) subsequently measuring, as a second measuring step, said torquer currents as measures of said angular rates with the direction of rotation of the gyro rotor reversed and said signals from said pick-offs inverted, (c) determining a first value of a heading angle of an inertial reference system from the torquer currents measured during said first measuring step, (d) determining a second value of said heading angle from the torquer currents measured during said second measuring step and (e) forming a mean using both said first and second values as a heading angle output from said inertial reference system.

2. A method as claimed in claim 1, wherein consecutively more than two measuring steps with different directions of rotation of said gyro rotor are performed, said mean being formed from all heading angle values provided by said measuring steps.

3. A method as claimed in claim 1, wherein determining of said heading angle value comprises the steps of:

(a) determining, from said torquer currents, an estimated attitude of said inertial reference system, said attitude being represented by a directional cosine matrix, (b) placing two accelerometers in alignment with said input axis of the gyro, said two accelerometers providing respective acceleration signals, (c) transforming said acceleration signals into a fixed, predetermined reference system, making use of said directional cosine matrix, to provide transformed acceleration signals, (d) forming correction signals from said transformed acceleration signals by means of an optimal filter, (e) re-transforming said correction signals to correct said attitude as determined from said torquer currents, and (f) forming estimators of state variables from said transformed acceleration signals, said heading angle being derived from said state variables.

4. A gyro device for determining a heading angle with means for eliminating gyro errors, comprising:

(a) an electrically caged, two-axis gyro of the type having a housing, a gyro rotor rotating in said housing about a spin axis, a first pick-off responding to rotary movement of said gyro rotor relative to said housing about a first input axis orthogonal to said spin axis, a second pick-off responding to rotary movement of said gyro rotor relative to said housing about a second input axis orthogonal to both said spin axis and said first input axis, a first torquer arranged to exert a torque on said gyro rotor about said first input axis, said first torquer being energized by a first torquer current derived from signals from said second pick-off through amplifier network means, a second torquer arranged to exert a torque on said gyro rotor about said second input axis, said second torquer being energized by a second torquer current derived from signals from said first pick-off through amplifier network means, whereby said first and second torquer currents are indicative of angular rates of said housing relative to inertial space about said second and first input axes, respectively, (b) means for reversing the direction of rotation of said gyro rotor to permit optional rotation of the gyro rotor in first and second directions of rotation, (c) means for reversing the polarity of the signals from said pick-offs simultaneously with the reversal of the direction of rotation of the gyro rotor, and (d) means for forming an inertial measuring value with gyro errors eliminated from the said torquer currents obtained with the two directions of rotation of the gyro and determined by the angular rates about the input axes of the gyro.

5. A device as claimed in claim 4, wherein (a) the gyro is part of an inertial reference system which includes two accelerometers aligned with the input axes of the gyro, (b) said means for forming an inertial measuring value comprise means for determining the attitude of said reference system from angular rate signals provided by the gyro, and transformation means for transforming the signals from said two accelerometers into transformed acceleration signals referenced to a predetermined, fixed reference system, an optimal filter, to which said transformed acceleration signals are applied, for providing correction signals and state variables, means for re-transforming said correction signals and for providing signals which are applied to said attitude determining means and which correct the attitude of the reference system determined by said attitude determining means, and means for determining a heading angle from the state variables provided by said optimal filter, and (c) means for forming the mean of the values of said heading angle obtained with one and the other direction of rotation of the gyro rotor.

6. A device as claimed in claim 5, wherein said gyro is part of a gyro assembly having a plurality of redundantly provided additional gyros, wherein only said gyro has its direction of rotation and its polarity of the pick-off signals reversible for the elimination of gyro errors.

7. Redundant inertial reference system comprising a plurality of two-axis gyros having two input axes which are integrated in a gyro assembly, an inertial measuring value being formed from the signals of these gyros, wherein (a) only a preselected one of the gyros of said gyro assembly is rotatable through 180° about its spin axis from a first position into a second position, (b) means for forming said inertial measuring value in said first and second positions of said one gyro are provided, and (c) means for forming an output signal indicative of said inertial measuring value and corrected for gyro errors is formed from the values of said inertial measuring value obtained in said two positions of said one gyro.

8. An inertial reference system as claimed in claim 7, wherein said inertial measuring value is heading.

9. An inertial reference system as claimed in claim 8, wherein
  (a) said inertial reference system includes two accelerometers aligned with the input axes of the gyro,
  (b) said means for forming an inertial measuring value comprise
    means for determining the attitude of said reference system from angular rate signals provided by the gyro, and
    transformation means for transforming the signals from said two accelerometers into transformed acceleration signals referenced to a predetermined, fixed reference system,
    an optimal filter, to which said transformed acceleration signals are applied, for providing correction signals and state variables,
    means for re-transforming said correction signals and for providing signals which are applied to said attitude determining means and which correct the attitude of the reference system determined by said attitude determining means, and
    means for determining a heading angle from the state variables provided by said optimal filter, and
  (c) means for forming the mean of the values of said heading angle obtained with said first and second positions of the gyro rotor.

* * * * *